(12) United States Patent
Westfall

(10) Patent No.: US 6,957,492 B1
(45) Date of Patent: Oct. 25, 2005

(54) COOKING IMPLEMENT WITH HANDLE STORAGE FEATURE

(76) Inventor: Ray L. Westfall, 9265 Feather Way, Delhi, CA (US) 95315

(*) Notice: Subject to any disclaimer, the term of this patent is extended or adjusted under 35 U.S.C. 154(b) by 0 days.

(21) Appl. No.: 10/781,215

(22) Filed: Feb. 17, 2004

(51) Int. Cl.[7] .............................................. A47J 43/28
(52) U.S. Cl. ............................. 30/151; 30/143; 99/419
(58) Field of Search ............................. 30/125, 136.5, 30/151, 322, 324, 329, 332, 340, 342, 526, 30/143; 15/145; 99/419, 421 A, 449

(56) References Cited

U.S. PATENT DOCUMENTS

| | | | |
|---|---|---|---|
| 604,965 A | | 5/1898 | Cartwright |
| 682,892 A | | 9/1901 | Thurston |
| 850,189 A | * | 4/1907 | Stephenson .................... 7/160 |
| 1,705,205 A | * | 3/1929 | Reams ......................... 81/490 |
| 1,809,254 A | * | 6/1931 | Smith .......................... 30/322 |
| 1,814,547 A | | 7/1931 | Edwards |
| 2,921,326 A | * | 1/1960 | Lautmann .................... 15/145 |
| 3,485,520 A | * | 12/1969 | Alexander ................. 403/334 |
| 3,861,087 A | * | 1/1975 | Martin ....................... 451/557 |
| 4,332,409 A | | 6/1982 | Stachowicz |
| 4,945,639 A | * | 8/1990 | Kirby .......................... 30/329 |
| 5,206,998 A | | 5/1993 | Oriente et al. |
| 5,600,914 A | * | 2/1997 | Tatar .............................. 43/6 |
| 5,669,143 A | * | 9/1997 | Wu ............................. 30/324 |
| 5,752,285 A | | 5/1998 | Bendheim et al. |
| 5,791,053 A | * | 8/1998 | Koong ......................... 30/142 |
| 6,675,482 B1 | * | 1/2004 | Gilbert. et al. ................ 30/141 |
| 6,877,232 B2 | * | 4/2005 | Harmon et al. ............... 30/322 |
| 2003/0030291 A1 | | 2/2003 | Neal et al. |

OTHER PUBLICATIONS

Outdoor Cooking.com webpage (1 page) Rolla Coaster Camping Fork, Dec. 27, 2003.
Hotdogsticks.com webpage (3 pages total), Dec. 27, 2003.
Lee Valley&& Veritas webpage (1 page) Telescoping Campfire Fork, Dec. 27, 2003.
Fire Pie Trail Store webpage (3 pages), Dec. 27, 2003.

* cited by examiner

Primary Examiner—Hwei-Siu Payer
(74) Attorney, Agent, or Firm—John P. Costello

(57) ABSTRACT

A cooking implement is disclosed which is comprised of a hollow sheath and a utensil, wherein the utensil can be stored within the hollow sheath. The utensil can be a fork, knife, spoon, skewer or any myriad of other types of utensils. The sheath serves as both a storage compartment for the utensil, and when coupled to the end of the utensil, serves as an elongate handle which allows the user to stand back a safe distance while manipulating food items over flames and smoke. When the utensil is stored within the hollow sheath, the implement is very compact and can fit easily in a portable cooler or the like for later use at a barbeque, camping event or any other outdoor cooking venue. The implement also has a hanger to allow it to be hung at any desired cooking location by the user.

2 Claims, 3 Drawing Sheets

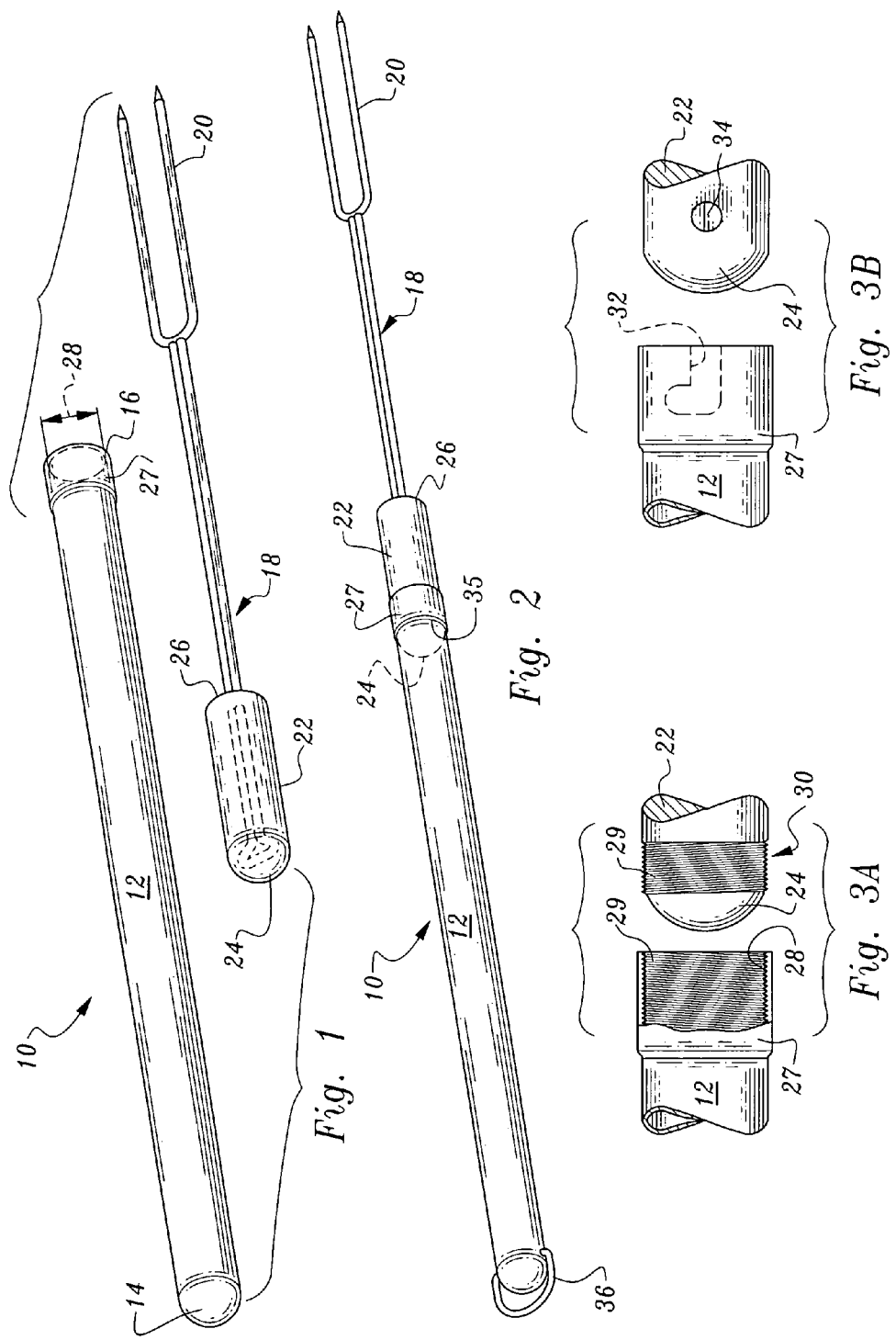

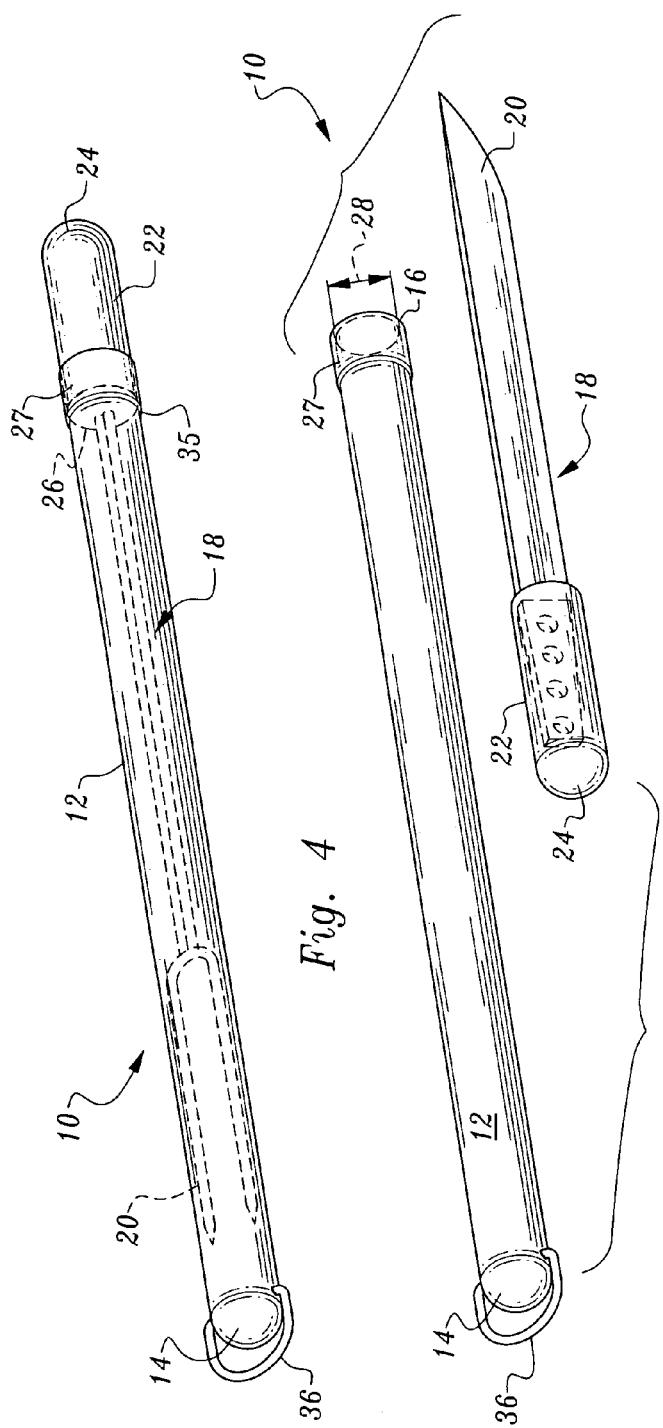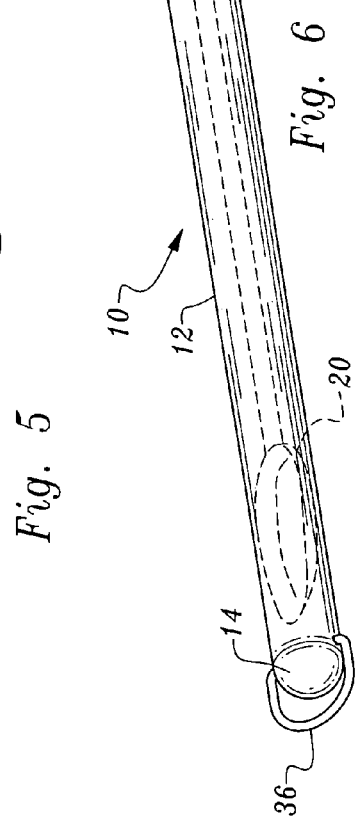

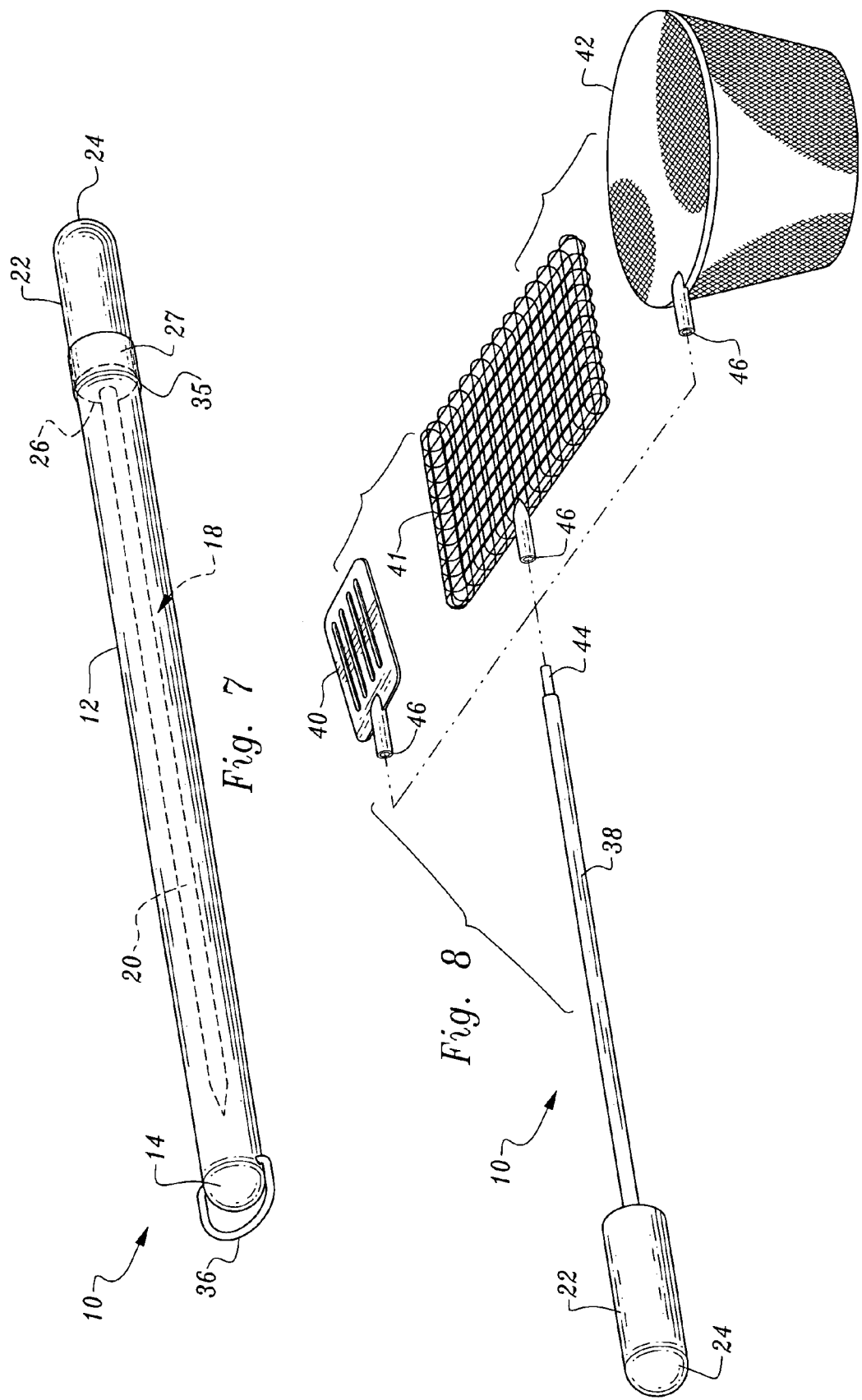

COOKING IMPLEMENT WITH HANDLE STORAGE FEATURE

TECHNICAL FIELD

This invention relates to the field of cooking implements, and more specifically to cooking implements which can be safely used in a cooking environment of heat and flames.

BACKGROUND

Many cooking environments produce an abundance of heat, smoke and flames Indoor and outdoor grills, camp fires, gas and charcoal barbeques all have the potential for producing heat, smoke and flames. In flame-up situations especially, the chef must act quickly to move a food item outside of the flames or else the food item will become burned beyond recognition. To assist in manipulating food items in these environments, a variety of long-handled cooking implements have been devised. Long forks, tongs, knives, and the like have been developed to allow a chef to safely stand away from the heat and flames and manipulate food items to a safer location on the cooking surface. While useful, these long implements cannot be easily broken down to a more manageable size for placing in a small portable cooler, for example, so that the implement can be transported and re-assembled at another cooking location. Along with the lack of portability, it is a given that cooking implements introduced into an environment of smoke and flames become greasy and dirty. Transporting the presently available long implements requires that they be washed thoroughly, and/or wrapped to avoid contacting and contaminating clothing or automobile upholstery, for example. As such, present long implements are best suited to remain at a single cooking location, due to their impracticality in transporting to other locations in a dirt free manner.

Also having sharp utensil ends exposed can be a source for injury as a user reaches for an implement. Exposed fork ends or knife blades of an implement placed in a bag or cooler during transport create a real possibility for injury when a user reaches into the bag or cooler to retrieve the implement for use at another location. It is best if the implements incorporate a sheath or cover over the exposed sharp edges to lend to a safer cooking implement.

U.S. Pat. No. 604, 965 issued to Cartwright discloses a combination potato masher, kettle cleaner and fork. Of interest in this patent is that a hollow sheath serves as a basis for attaching a potato masher and further as a storage device for the fork. Here, the fork is kept free from contact with other surfaces while being stored within the sheath, however, the potato masher implement remains exposed, and is bulky, creating both potential for contamination and creating difficulty in transport due to its ungainly structure. A potato masher is not an implement that is used for manipulating food items in smoke and flames and removing the potato masher from the sheath exposes the fork to the outside environment, thereby reintroducing the potential for contamination from the fork.

Therefore, a needs exists for a long implement that is practical for manipulating food items in heat, smoke and flames and that can additionally be broken down to a manageable size for transporting to other cooking environments without the potential for contaminating clothing, upholstery and the like.

SUMMARY OF THE INVENTION

The inventive apparatus is a cooking implement comprised of a hollow sheath and a utensil. The hollow sheath is closed at a first end and open at an opposite, female end. The utensil has a male portion coupled to a utensil end which can be a fork or a knife blade, for example. The male portion couples with the open female end of the sheath Upon joining the female end of the sheath with the male portion of the utensil, the sheath forms an elongated handle for grasping by a user and also for manipulating the end of the utensil which contacts a food item being cooked.

The hollow sheath of the inventive cooking implement is sized to allow the utensil to be stored therein, and the male portion of the utensil forms a cap or closure of the hollow cavity of the sheath. In the stored configuration, the sheathed utensil portion of the cooking implement is entirely sealed off from outside air or light thereby preventing contamination of clothes or upholstery from occurring, and also covering all sharp utensil edges. These features allow the device to be safely transported in a compact and manageable manner to different cooking locations, including outdoor barbeques, campsites, and the like.

Accordingly, the following objects and advantages of the invention apply:

It is an object of this invention to provide an inventive cooking implement that when assembled, provides a long implement having a length sufficient for safe cooking in the presence of heat and flames.

It is an object of this invention to provide an inventive cooking implement which can be broken down into a compact format.

It is still another object of this invention to provide an inventive cooking implement which provides a sheath for covering sharp utensil edges during its stored configuration.

It is another object of this invention to provide an inventive cooking implement wherein the food contacting utensil can be easily stored and sealed off from light and air so as to avoid contamination of clothes, upholstery and the like.

Further objects and advantages of the invention will be brought out in the following portions of the specification, wherein the detailed description is for the purpose of fully disclosing preferred embodiments of the invention, without placing limitations thereon.

BRIEF DESCRIPTION OF THE DRAWINGS

The invention will be more fully understood by reference to the following drawings which are for illustrative purposes only:

FIG. 1 is a side elevated perspective view of the inventive cooking implement showing the utensil and sheath separated in preparation for assembly.

FIG. 2 is a perspective view of the inventive apparatus shown in its assembled state, with the rounded end of the male portion (shown in phantom) seated within the expanded section of the sheath.

FIG. 3A is a side cutaway view of a threaded embodiment of the sheath and male portion, shown positioned for threadable joining.

FIG. 3B is a side cutaway view of a slot and pin embodiment of the sheath and male portion, shown positioned for slot and pin joining.

FIG. 4 is a side perspective view showing the inventive implement in its stored state with the utensil end and part of the male portion (show in phantom) stored inside of the sheath.

FIG. 5 a side perspective view showing an alternate embodiment of the utensil where the utensil end is a knife blade.

FIG. 6 is a side perspective view showing an alternate embodiment of the utensil where the utensil end is a spoon.

FIG. 7 is a side perspective view showing an alternate embodiment of the utensil where the utensil end is skewer.

FIG. 8 is side perspective view showing an alternate embodiment of the utensil having a universal shaft allowing for interchangeable utensil ends.

DETAILED DESCRIPTION OF THE PREFERRED EMBODIMENTS

Referring to FIG. 1, the preferred embodiment of the inventive cooking implement 10 is shown. The implement 10 is comprised of a sheath 12 having a closed first end 14 and an opposite open female end 16, and a utensil 18 that is comprised of a utensil end 20 and a male portion 22. In the assembled state of the inventive implement 10, the male portion 22 of the utensil 18 inserts into the open female end 16 of the sheath 12 as shown in FIG. 2. The sheath and male portion of the utensil are preferably cylindrical, the male portion having a rounded, blunt first end 24 free of sharp edges to allow it to insert easily and freely into the female end 16 of the sheath 12. The sheath 12 and male portion 22 may be comprised of aluminum or heat resistant plastic, but are not limited to these materials. The male portion 22 also has an opposite end 26 which receives the utensil end 20, the utensil end being embedded into the male portion by epoxy, for example. The male portion 22 can act as a handle by itself to manipulate the utensil end 20, however, attachment to the sheath 12 in the manner as further herein described provides a greater level of safe distance from heat and flames. The male portion 22 is preferably 3"–5" in length. The hollow cylindrical sheath 12 is preferably about 15" in length, which is long enough to accept the utensil 18 therein. The sheath includes an expanded section 27 having an increased inside diameter 28 at the female end 16, to allow sufficient inside diameter for the entry of the male portion 22 of the utensil 18. The expanded section 27 could be tapered or expanded to allow sufficient inside diameter 28 to receive the male portion 22. The inside diameter and length of the expanded section 27 is sufficient to allow a snug friction fit with the male portion 22 of the utensil 18. The expanded section 27 is preferably between ¾" to 3" in length. These lengths have been found to be sufficient to create a good friction fit without the male portion 22 becoming loose and falling out of the expanded section 27 during use. When assembled, the sheath 12 acts as an elongate handle for grasping, and further manipulating the utensil end 20 against a food item. The utensil end 20 may be about 14" in length and when combined with its connected male portion 22 and assembled with the sheath 12, these three items provide sufficient distance to allow the user to safely manipulate a food item in a cooking environment of heat and flames.

FIGS. 3A and 3B show further modifications to the expanded section 27 and male portion 22 for providing a means for joining the two pieces together. In FIG. 3A, the inside diameter 28 of the expanded section 27 is threaded 29 as is the outside diameter 30 of the male portion 22 of the utensil 18. In this way the two pieces can be joined in a threadable manner. In FIG. 3B, the expanded section 27 includes a slot 32 and the male portion 22 includes a pin 34 for joining together accordingly.

FIG. 4 shows the inventive implement 10 in its stored state. As shown, the sheath 12 is sufficiently elongate to allow the utensil end 20 of the utensil 18 to fit entirely therein, while the male portion 22 is reversed from its assembled positioning, and acts as a closure means capping off the open female end 16 of the sheath. The opposite end 26 of the male portion 22 seats against the bottom end 35 of the expanded section 27. In this manner, the utensil end 20, which may be dirty and greasy after use, is completely sealed within the sheath 12 and cannot contaminate any exterior items such as clothes or upholstery. In its stored state, the tubular sheath 12 and opposing, rounded ends 14, 24 of the sheath and male portion 22 provide an aesthetically pleasing carrying case for the utensil 18. A hanger 36 as shown allows the implement, in either its assembled or stored state, to be conveniently hung near a cooking area, such as near a barbeque. The hanger 36 can be rotatably attached to the sheath to allow it to be positioned for easier hanging on a hook, for example.

FIG. 5 shows an alternate embodiment of the inventive implement 10. Here, instead of the utensil end 20 being a fork as was shown in the previous illustrations, the utensil end 20 is a knife blade. The assembly of the male portion 22 with the sheath 12 as well as the storage of the knife blade within the sheath is the same as previously described for the fork embodiment. Other embodiments of the utensil end 20, such as a spoon as seen in FIG. 6 or skewer as seen in FIG. 7, while not limiting, are within the scope of this invention.

FIG. 8 shows another alternate embodiment of the inventive implement 10. Here, a universal shaft 38 coupled to the male portion 22 allows for a number of interchangeable utensil ends 40–42 to be used. This embodiment allows utensil ends 40–42 having a width greater than the sheath 12 (and therefore not storable within the sheath) to be used. Here the utensil end is a spatula 40, a fish basket 41 or a popcorn cooking pot 42. One method of allowing the universal shaft 38 to couple with the different utensil ends 40–42 is to have the shaft include a male portion 44 which couples with a female portion 46 located on the utensil ends 40–42. Other means such as threadable engagement or slot and pin engagement, while not limiting are other contemplated means for coupling the universal shaft 38 with the various interchangeable utensil ends 40–42.

Finally, although the description above contains many specificities, these should not be construed as limiting the scope of the invention but as merely providing illustrations of some of the presently preferred embodiments of this invention. This invention may be altered and rearranged in numerous ways by one skilled in the art without departing from the coverage of any patent claims which are supported by this specification.

What is claimed is:

1. A cooking implement, comprising:
    a hollow sheath, said sheath being closed at a first end and having an opposite female end, said female end opening into an expanded section comprising a larger inside diameter than the remainder of said sheath;
    a utensil comprising a utensil end for interacting with a food item and an opposite male portion for inserting into said female end of said sheath;
    said expanded section being diametrically and longitudinally sized to snugly receive said male portion in a friction fit and upon joining said male portion to said female end, said sheath forming an elongate handle for grasping by a user to manipulate said utensil end;

said male portion further comprising a rounded end and an opposite end, wherein upon inserting said utensil end into said hollow sheath, said opposite end of said male portion seats within said expanded section with a friction fit to fully enclose said utensil end within said sheath.

2. The cooking implement as recited in claim 1, wherein said sheath and male portion are cylindrical and said closed end of said sheath is rounded identically to said rounded end of said male portion.

\* \* \* \* \*